Feb. 14, 1933.  A. S. JOHNSON  1,897,905
FLOWER STAND
Filed Aug. 4, 1931
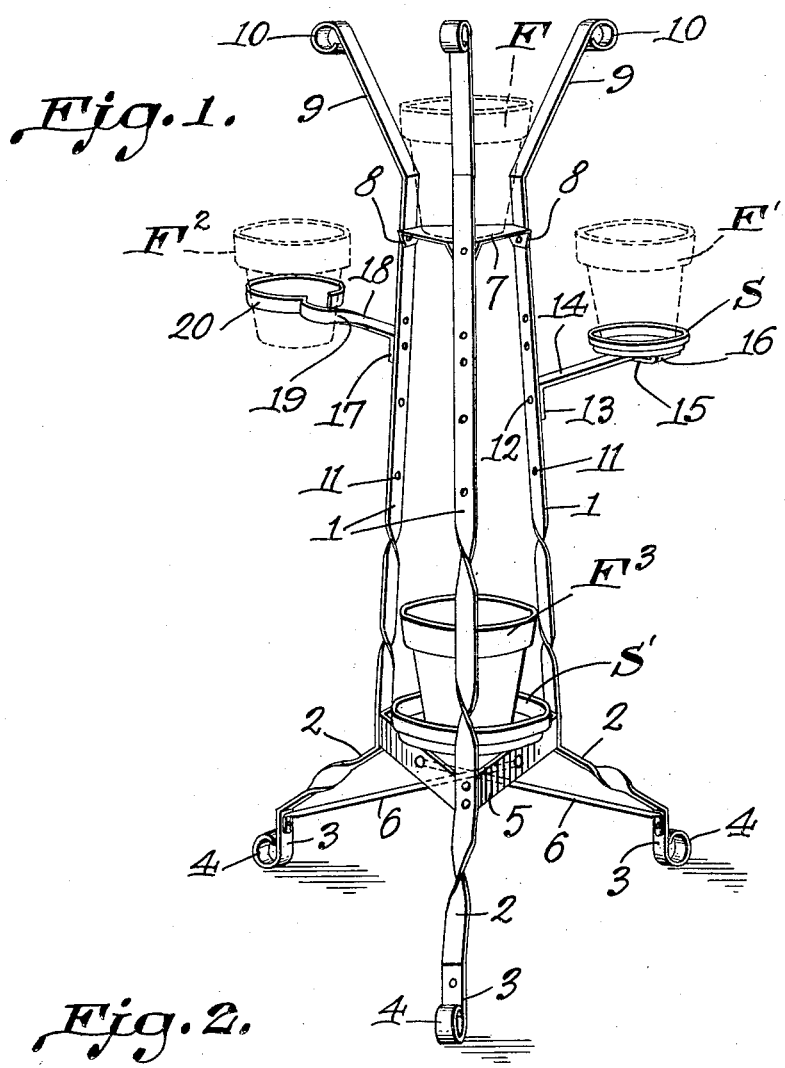
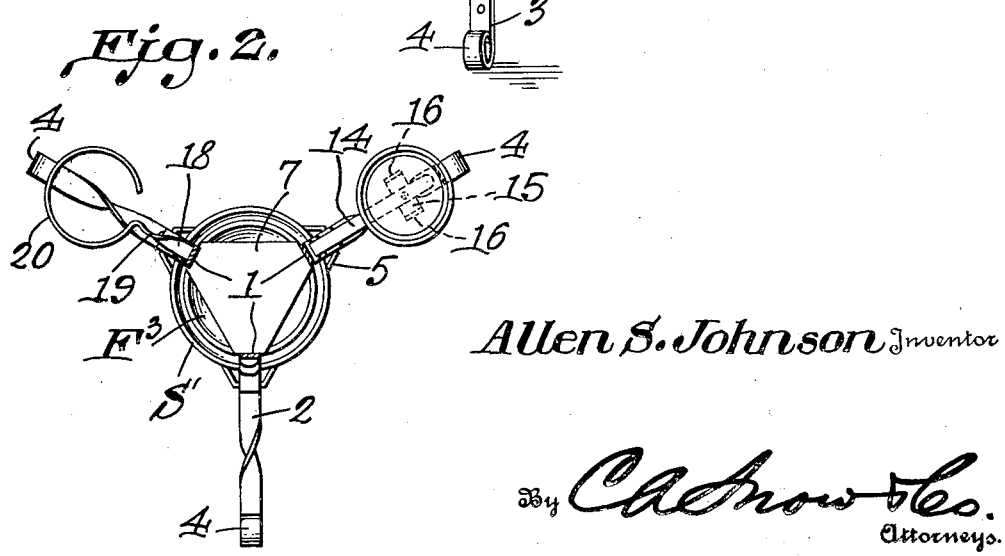
Allen S. Johnson, Inventor Patented Feb. 14, 1933

1,897,905

UNITED STATES PATENT OFFICE

ALLEN S. JOHNSON, OF BETHLEHEM, PENNSYLVANIA

FLOWER STAND

Application filed August 4, 1931. Serial No. 555,102.

This invention relates to a stand for holding flower pots and other containers of growing plants.

It is an object to provide a device of this type which is not only of attractive appearance but also constitutes a means whereby a number of flower pots can be supported simultaneously, the supporting structure being so shaped and proportioned that the danger of tilting is reduced to the minimum.

Another object is to provide a flower stand which is adjustable to meet the requirements of the user.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing the preferred forms of the invention have been shown.

In said drawing:

Figure 1 is a perspective view of the stand, some flower pots being shown thereon both in full lines and in dotted lines.

Figure 2 is a horizontal section through the upper portion of the stand.

Referring to the figures by characters of reference, 1 designates upwardly converging standards which can be made of metal strips twisted or otherwise formed and the lower ends of these strips diverge abruptly as shown at 2 to form legs which terminate in feet 3 formed by extending the ends of the strips downwardly and then curling them upwardly and inwardly as shown at 4. A substantially triangular frame 5 can be set between the standards 1 adjacent to the legs 2, this frame being secured to the standards in any suitable manner. The centers of the sides of the frame can be connected by brace rods 6 to the respective feet 3 as shown.

Secured between the upper portions of the standards is a shelf 7 which can be a substantially triangular plate having depending ears 8 bolted or otherwise attached to the standards. The upper ends of the standards are inclined upwardly and outwardly as at 9 and terminate in curved ends 10. These inclined portions constitute centering arms for guiding a flower pot F or the like downwardly to position on the shelf 7 and between the upper ends of the standards 1.

A longitudinal series of apertures 11 can be formed in each standard and any of the apertures can receive a bolt 12 or the like used for fastening the base 13 of a bracket. One of these brackets can consist of an arm 14 to the end of which is secured a transverse supporting plate 15 having upstanding flanges 16 at its ends. A saucer S or the like can be mounted on the arm 14 and flanges 16 and used for holding a flower pot as indicated by broken lines at F' in Figure 1. Any number of these brackets can be used or if preferred one or more brackets of a different construction can be employed. This other form of bracket includes in addition to the base 17 an arm 18 which is twisted as at 19 and merges into a spring hook 20 substantially in the form of a split ring. This ring is adapted to embrace a flower pot $F^2$ so as to support it firmly without danger of falling out of position. As the hook is made of resilient metal or the like it can be adapted to flower pots of different sizes.

The frame 5 serves to support a saucer S' in which may be placed a large pot $F^3$ which is thus not only properly supported for holding flowers but also serves as a weight which, being located at the center of gravity and near the base of the stand, tends to prevent accidental overturning of the stand.

What is claimed is:

A flower stand including upwardly extending standards, upwardly diverging arms at the upper ends of the standards constituting guides, a flat, one-piece shelf secured to the standards close to and below the guides and constituting a connection between the standards, a frame secured to the lower portions of the standards and connecting them, legs diverging downwardly from the frame, said legs being integral with the standards, a brace connecting each leg with the remote side of the frame, and brackets adjustably connected to the standards, one of said brackets including an arm and a resilient open hook at the end of the arm for embracing and gripping a flower pot to support the same.

In testimony that I claim the foregoing as my own, I have hereto affixed my signature.

ALLEN S. JOHNSON.